July 22, 1941.  V. GREY  2,250,017
METALWORKING APPARATUS
Filed March 24, 1939
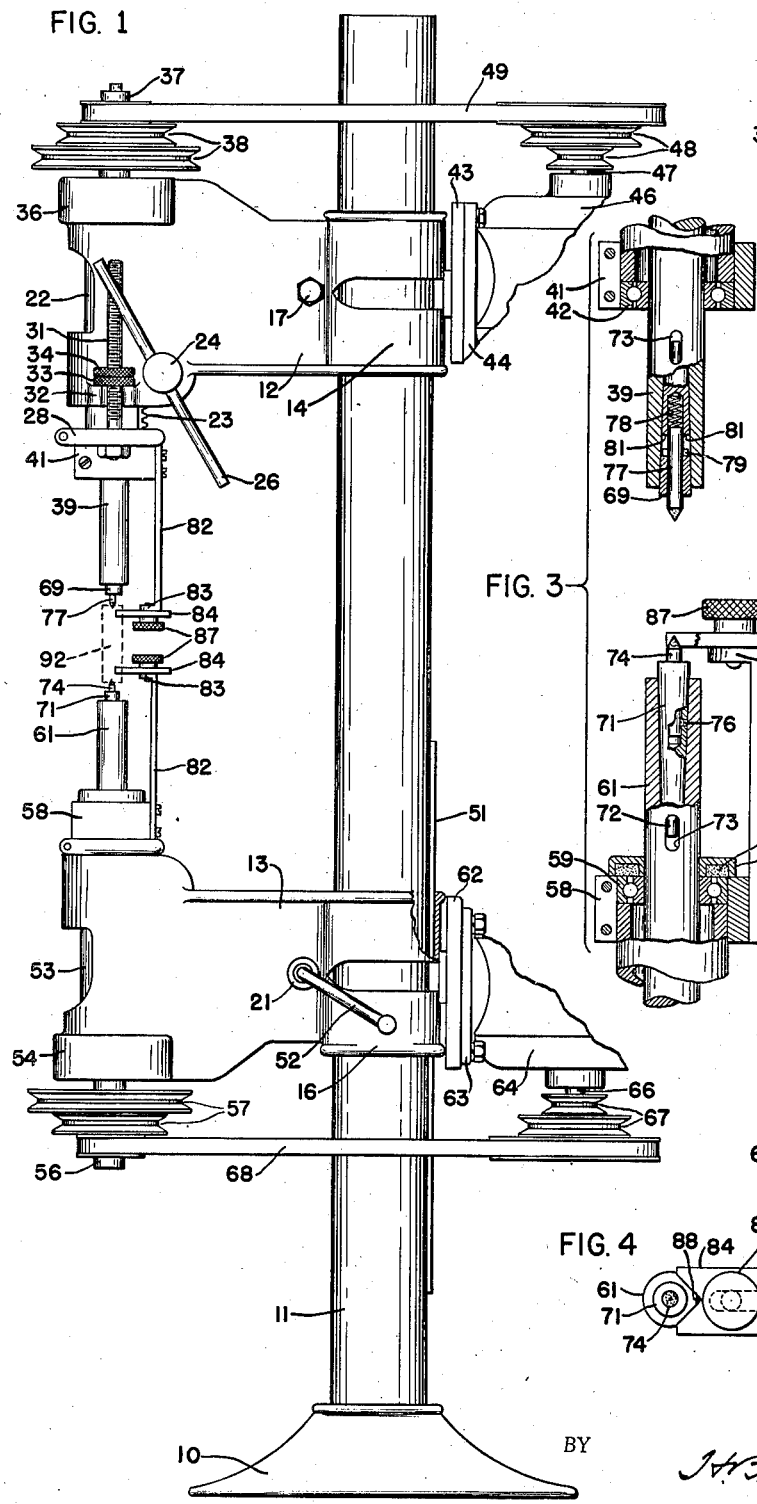
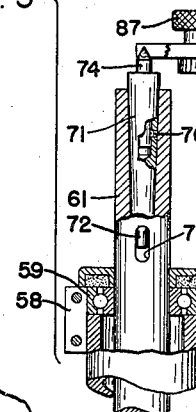
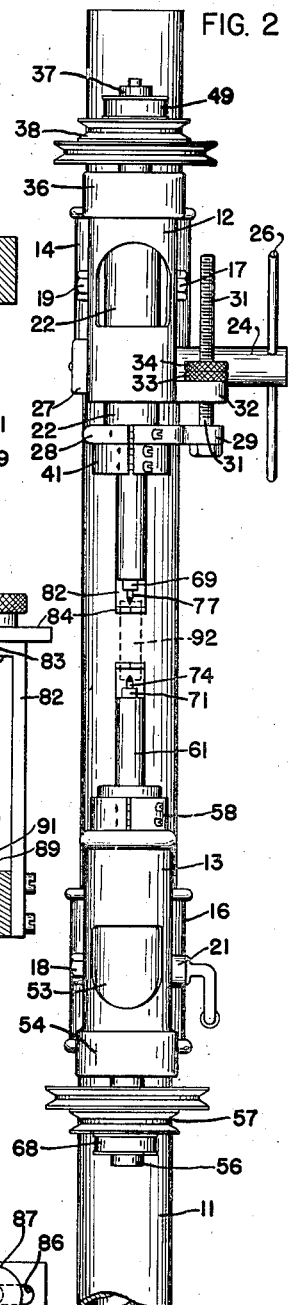
INVENTOR.
VICTOR GREY
BY
J.H.B. Whitfield
ATTORNEY.

Patented July 22, 1941

2,250,017

UNITED STATES PATENT OFFICE 2,250,017

METALWORKING APPARATUS

Victor Grey, Chicago, Ill., assignor to Teletype Corporation, Chicago, Ill., a corporation of Delaware Application March 24, 1939, Serial No. 263,859

6 Claims. (Cl. 51—111)

This invention relates to metalworking machines and particularly to apparatus for finishing metal surfaces by friction and/or abrasive action.

More specifically the invention relates to the lapping of conical centers in the ends of metal shafts.

An object of the invention is to provide for the simultaneous lapping of centers in both ends of a part being processed.

Another object of the invention is to render the pressure of the tool upon the part being processed substantially independent of the operator controlled feeding of the tool into contact with the part.

The invention features a spring backing for a lapping tool whereby the pressure exerted by the tool upon the work is determined by the force stored in the backing spring. The invention also features adjustable means for guiding the placement of the work in the approximate position for engagement by the tool, which in turn operates to withdraw the work from engagement with the guiding means thereby avoiding the possibility of drag and accompanying lateral thrust upon the work.

According to the preferred embodiment of the invention, there is provided upon a vertically disposed post a pair of tool spindle heads. At least one of the heads is movable axially of the supporting post so that the distance between the two heads may be varied to accommodate work pieces of different lengths. Each of the heads supports the rotatable tool spindle and the heads are so positioned that the spindles are in coaxial relation to each other. Rotation is imparted to each of the tool spindles and the direction of rotation of one is opposite to that of the other, it being preferred that the two spindles rotate at approximately the same speed. Each of the spindles is supported in a nonrotatable sleeve and the sleeve in the upper spindle head is mounted for movement along its axis to feed the upper tool spindle toward the lower spindle, a rack and pinion mechanism being provided for imparting such motion. The upper spindle sleeve has a threaded stud which passes through a bracket secured to or integral with the upper spindle head. A knurled stop nut and a similar lock nut are threaded on the stud and may be locked in any desired position throughout the length thereof. The stop nut, by coming into engagement with the bracket through which the threaded stud passes, determines the extent of downward movement of the upper spindle under the control of the rack and pinion mechanism.

Each of the rotatable spindles receives and imparts motion to a tool holder, each of which has a socket for receiving a lapping tool. The lower tool holder fixedly engages the spindle and the tool contained in the socket of the lower tool holder fixedly engages that holder. The upper tool holder is fixedly held in the upper spindle, but the upper lapping tool is slidably supported in the holder, is backed by a compression spring, and is retained in the holder by a pin extending through diametrically opposed slots in the tool holder and through a hole in the shank of the lapping tool. The purpose of the slidable lapping tool and backing spring is to accommodate small variations in the lengths of similar work pieces, whereby the spindle sleeve may be brought into the same operated position for each as determined by the stop nut on the threaded stud and to regulate the pressure of the lapping tools upon the work piece.

For a more complete disclosure of the apparatus according to the present invention, reference may be had to the following detailed description to be interpreted with the accompanying drawing, in which, Fig. 1 is a side elevational view of the preferred embodiment of the invention;

Fig. 2 is a front elevational view of the metalworking machine shown in Fig. 1;

Fig. 3 is a detail view partly in section showing the opposed tools, tool holders, and spindles; and Fig. 4 is an end view of one of the tool spindles and work positioning guides.

Referring to the drawing and particularly to Figs. 1 and 2, the reference numeral 10 indicates a machine base which is adapted to rest upon the floor and to be secured thereto, if desired. A machine column or post 11 is mounted in the base 10 and supports upper and lower tool spindle heads 12 and 13, respectively. The mounting of heads 12 and 13 upon post 11 is by means of axially bored cylindrical portions 14 and 16, respectively, of the heads 12 and 13. For clamping the heads to post 11, their cylindrical enlargements 14 and 16 may be slotted in a vertical plane passing through the center of post 11 and the centers of the tool spindles, and the divided parts thus defined, may be brought into clamping engagement with post 11 by bolts 17 and 18 (Figs. 1 and 2) which threadedly receive nuts 19 and 21.

The upper spindle head 12 is cylindrically bored on a vertical axis at the front to receive a cylindrical spindle sleeve 22. Sleeve 22 is slidable vertically in head 12 and has secured thereto a rack 23 with which meshes a pinion (not shown) carried by stub shaft 24. Stub shaft 24 is provided with an operating handle 26 by means of which it may be rotated manually to move spindle sleeve 22 upwardly or downwardly as desired. Stub shaft 24 is biased in clockwise direction, as viewed in Fig. 1, by a coiled spring (not shown) contained in housing 27, shown in Fig. 2, whereby spindle sleeve 22 is normally presented in its uppermost position. Rotation of stub shaft 24 to move spindle 22 downwardly is opposed by the spring in housing 27 which has its tension thereby increased. As shown in Fig. 2, sleeve 22 has secured near its lower end a split ring clamp 28, which has a laterally extending projection 29. Projection 29 has secured thereto an upwardly extending threaded stud 31 which passes freely through a slot in a rightwardly extending projection 32 (Fig. 2) of head 12. Above the projection 32, stud 31 threadedly supports a stop nut 33 and a locking nut 34. Stop nut 33 may be placed in any desired position along the axis of stud 31 and may be locked in that position by lock nut 34 so that when spindle sleeve 22 is moved downwardly by rotation of stub shaft 24, stop nut 33 limits such downward movement by coming into abutting relation with the upper surface of projection 32 of upper head 12.

At the top of the foremost portion of spindle head 12 is a bearing housing 36 in which is rotatably supported in a suitable bearing, the lower end of an axially bored hub 37 of a multiple pulley 38. The hub 37 has an internal key (not shown) and slidably disposed in the hub 37 is the reduced upper end of a tool spindle 39 which has a keyway for cooperation with the key of hub 37, whereby rotation will be imparted to tool spindle 39 when multiple pulley 38 is rotated. At the lower end of spindle sleeve 22, a split collar 41 is clamped thereto below the split ring 28, the collar 41 extending below the lower end of sleeve 22. The split collar receives and clamps the outer race of an antifriction bearing mechanism 42, which is of the same outside diameter as the sleeve 22. The inner race of the antifriction bearing mechanism 42 is press fitted to tool spindle 39 so that there is maintained a fixed axial relation between sleeve 22 and spindle 39. The spindle 39 is moved upwardly or downwardly as sleeve 22 is moved. The reduced upper end of spindle 39 being slidably supported in hub 37 of multiple pulleys 38, in key and keyway engagement therewith, spindle 39 moves axially within pulleys 38 as sleeve 22 is moved axially, but rotation is imparted to spindle 39 when pulleys 38 are rotated.

At the rear of spindle head 12, there is provided in a vertical plane a flat plate 43 to which is bolted the mounting plate or bracket 44 of an electric motor 46. The rotor shaft 47 of motor 46 has secured thereto multiple pulleys 48 of graduated size in inverse order to the multiple pulleys 38. A power transmitting belt 49 may be placed around any of the pulleys 48 and around the particular one of the pulleys 38 aligned therewith for transmitting power to drive spindle 39. By providing the multiple pulleys 38 and 48, several speeds of spindle 39 may be obtained from a single speed motor.

As shown in Figs. 1 and 2, the previously mentioned lower spindle head 13 is mounted on post 11 in inverted relation with respect to upper spindle head 12. For a considerable distance near the lower end, post 11 has secured thereto at the rear a key bar 51. The cylindrical portion 16 of head 13 which clamps to post 11 is provided with an internal slot parallel to the axis thereof in which key 51 is disposed. Thus, a fixed angular relation of lower spindle head 13 to post 11 is determined. The nut 21, by which cylindrical portion 16 of lower head 13 is drawn into clamping engagement with post 11 has integral therewith or secured thereto a wrench handle 52 by which the clamping engagement of head 13 with post 11 may be readily loosened in order that head 13 may be moved along post 11 to vary the distance from head 12 and may be clamped in any desired position. Lower head 13 supports a spindle sleeve 53 which differs from the upper spindle sleeve 22 in that it is not provided with rack teeth, but is clamped in fixed relation to head 13. Due to the inversion of lower head 13, the bearing housing 54 thereof is presented at the bottom of the head and this housing supports and retains a bearing (not shown) in which is rotatably retained the upper end of hub 56 of multiple pulley 57. At the upper end of lower spindle sleeve 53 a split collar 58 is clamped, as shown in Figs. 1, 2, and 3. The collar 58 extends above the upper end of sleeve 53 and receives and clamps the outer race of an antifriction bearing mechanism 59, the outside diameter of which is the same as that of spindle sleeve 53. A tool spindle 61, having its tool-receiving socket presented upwardly, is press fitted into the inner race of antifriction bearing mechanism 59 and extends downwardly through spindle sleeve 53 and into the bore of hub 56 of multiple pulleys 57 where it has key and keyway engagement with the hub for the purpose of imparting rotation from pulleys 57 to spindle 61. Since spindle sleeve 53 is fixed with respect to lower head 13, spindle 61 does not undergo sliding movement with respect to the hub 56 by which it is driven.

At the rear of head 13, there is supported in vertical plane a flat plate 62 to which is bolted the mounting plate or bracket 63 of a motor 64. At the lower end of rotor shaft 66 of the motor, multiple pulleys 67 are supported to be driven by shaft 66 and pulleys 67 bear the same relation to pulleys 57 that the pulleys 48 of the upper motor bear to upper spindle pulleys 38, whereby a plurality of spindle speeds may be obtained from a single speed motor. A belt 68 transmits power from pulleys 67 to pulleys 57 and the belt may be passed around any pair of pulleys. It will be understood that the independent motors 46 and 64 may, if desired, be replaced by a single countershaft to which the multiple pulleys 48 and 67 could be secured for transmitting driving power from a single motor or from any power driven shaft to both of the spindles 39 and 61. This might necessitate the use of flat belts and corresponding pulleys, as one of the belts would have to be crossed in order to achieve opposite rotation.

Each of the spindles 39 and 61 is provided at its free end with a socket for receiving a tool holder. In the particular embodiments shown in the drawing, the sockets in the spindles are conical in order to receive standard commercially available locking taper tool holders, such as holders having a Morse taper. The externally tapered tool holders are designated by the reference numerals 69 and 71, upper and lower, respectively, and are retained within and rotated by the spindles 39 and 61, respectively, by frictional engagement developed by wedging the holders into the tapered sockets in the spindles. As is well known, taper tool holders are sometimes provided with a flattened shank, as indicated at 72, which enters a correspondingly shaped portion of the inner end of the socket in the spindle, and may be the rotation receiving element if slippage occurs between the locking taper surfaces. The spindles are provided with slots 73 into which may be inserted a flat tapered knockout bar which enters slot 73 loosely and, upon being tapped in endwise direction after engaging shank 72 of the tapered tool holder, its increasing width causes the tool holder to be forced free of the socket, whereupon the tool holder may fall out or be lifted out, as the case may be.

Each of the tool holders 69 and 71 has a cylindrical socket or bore for receiving a metalworking tool. The lower tool 74 is retained against axial or rotational movement relative to its holder 71 by means of set screw 76 and, as shown in Fig. 3, tool 74 has a conical working end. A similar tool 77 is retained in upper tool holder 69, but its manner of retention differs from that of tool 74. Tool 77 is slidably supported in holder 69 and is backed by compression spring 78. Tool 77 is prevented from escaping from holder 69 by pin 79 which is inserted into a diametrically extending hole in the shank of tool 77 through a slot 81 in the wall of the tapered tool holder. Rotation is imparted to tool 77 from holder 69, through pin 79, the ends of which are disposed in the slots 81 in the holder. Tool 77 is thus slidable axially of holder 69, is normally presented in its outermost position, and the pressure which it may exert upon a work piece is limited by the compression spring 78 as long as the tool is not backed to its innermost position, as determined by the extent of slot 81 or the limit of compression of spring 78.

Each of the split collars 41 and 58 has secured thereto a flat bar 82 which extends parallel to the axis of its adjacent spindle and terminates just beyond the end of the tool carried by the spindle in a transversely extending portion 83. Each of the bars 82 supports in engagement with the outer face of its transversely extending portion 83 a work centering block 84 having an elongated slot 86 through which passes the shank of a knurled headed clamping screw 87. Each of the centering blocks 84 has at one end a V-shaped work centering notch 88.

In order that dust, and more especially metal chips or particles which may become detached from the work piece or the tools or both during a lapping operation, shall not fall upon the antifriction bearing mechanism 59 and become worked into the interior thereof, a dust cap is provided for this bearing. The dust cap, designated by the reference numeral 89, is an inverted cup washer having an inner annular flange in addition to the outer wall of the cup. The inverted cup fits over the spindle 61 and its inner annular flange may have some, although not necessarily extremely tight, frictional engagement with the surface of spindle 61. The closeness of the fit should be sufficient to prevent dirt or metal particles from working down between the spindle 61 and the inner flange of the inverted cup 89, which engagement will probably be sufficient to cause the inverted cup 89 to rotate with spindle 61. An annulus of felt or other absorbent and resilient material occupies the space between the inner and outer flanges of the inverted cup 89 which serves as a dust cap.

As set forth previously, the apparatus shown and described herein has been developed primarily for lapping conical centers in the ends of cylindrical shafts. Cylindrical shafts for many purposes are finished by a grinding operation. One reason for this is that steel rod may not be obtainable in the exact size desired, and oversized stock may be turned down in a lathe to approximately the desired size, whereupon the shaft is ground to the desired size, it being possible to achieve greater accuracy in the grinding operation than in the turning operation. Another circumstance is that a very smooth finished surface may be desired which can best be achieved by grinding the surface. It also frequently happens that in the course of a heat treatment operation upon cylindrical rod material, the rod, which may have been partially processed, becomes warped and it is necessary to grind the surface in order to restore it to true cylindricity. The accurate grinding of the surface of a rod or a shaft for any of the above or other reasons can be accomplished only if the centers upon which the rod is held during the grinding operation are accurately positioned and contoured. The grinding centers may be determined by drilling and countersinking the ends of the shafts to provide a conical depression in each end of the shaft. However, the accuracy of the countersinking operation may not always be depended upon, wherefore it becomes desirable to lap the conical indentation in order to obtain accurately defined conical surfaces.

The lapping of shaft centers, by means of the apparatus disclosed herein, will now be described. The upper spindle head 12, which is ordinarily not moved or disturbed in its position upon post 11, must be so aligned with respect to the lower head 13 that spindles 39 and 61 have a common axis of rotation. The first adjustment of the apparatus to be made for a particular job is the positioning of lower head 13 at such distance from the upper head 12 that when the spindle sleeve 22 is in its uppermost position, there will be sufficient clearance between the ends of lapping tools 74 and 77 to permit the work piece, the centers of which are to be lapped, to be introduced endwise between two lapping tools. Next, the centering blocks 84 are adjusted so that when a work piece, such as a cylindrical shaft, is placed in vertical position between the lapping tools 74 and 77, and with its cylindrical surface resting against the sides of the V-shaped notches 88, the free ends of the tools 77 and 74 will be respectively above and below the countersunk centers in the shaft, but the work piece will be slightly off center with respect to the axis of tools 77 and 74. After the foregoing adjustment has been made, spindles 39 and 61 may be set in rotation by the starting of motors 46 and 64, respectively, the belts 49 and 68 having previously been adjusted to establish the desired speed ratio between the spindles and their respective driving motors. Preferably, the spindles are driven at the same speed and in opposite direction. In this way, the torque which either of the lapping tools may tend to impart to the work piece will be opposed by an opposite and substantially equal torque which the other spindle tends to apply with the result that there will be little or no tendency for the work piece to rotate, but in the event that there is a differential, it will be so small that the operator can easily hold the work piece against rotation.

A work piece is brought into position to be operated upon by placing it in vertical position between the spindles with its surface resting against the sides of the V-shaped notches 88 in centering slot 84. The work piece may then be engaged by the two spindles by the downward motion of spindle sleeve 22 under the manual control of pinion shaft 24. As the upper lapping tool 77 enters the conical recess in the upper end of the work piece, it seeks to penetrate the recess as far as the opposed conical surfaces will permit and, in so doing, draws the work piece out of engagement with the sides of the V-shaped notch in the centering block 84 and similarly when the lower end of the work piece becomes seated upon the lower lapping tool 74, the cooperation of the conical tip of the tool with the opposed conical surface of the recess causes the lower end of the work piece to draw away from engagement with the lower centering block 84. Thus, the work piece is moved out of engagement with any portions of the machine except the tools themselves, and no lateral thrust or drag is applied to the work piece, it being merely held against rotation by the operator. The lowering of spindle sleeve by means of pinion shaft 24 continues until stop nut 33 comes into engagement with stop bracket 32. If stop nut 33 has been correctly adjusted, axially movable lapping tool 77 will have moved slightly farther into its holder 69, but not sufficiently to bring pin 79 into engagement with the upper ends of slot 81 in holder 69. Thus, the operator cannot develop excessive pressure between the lapping tools and the ends of the work piece, the pressure developed being determined by the weight of the work piece and force exerted by compression spring 78 upon the upper lapping tool 77. The reference numeral 92 designates in dotted outline a work piece in position to be processed by the lapping tools 74 and 77.

Numerous modifications of the apparatus may be necessitated by the lapping of various types of work pieces. For example, if a shaft, the centers of which are to be lapped, is relatively heavy, it may be desirable to substitute for the lower lapping tool a conical-tipped work center which merely supports but does not process the conical recess in the lower end of the shaft, and under these circumstances, the lower driving motor will not be operated, whereby relative motion between the work piece and the support will not occur. The reason for such substitution is that a heavy work piece would develop excessive pressure between itself and a lower lapping tool. With this arrangement, only one end of a work piece would be lapped at a time. As an alternative, the lower as well as the upper lapping tool may be spring backed, thus permitting the lower tool to yield and thereby relieve partially the pressure of the work piece upon it. It will also be understood the apparatus may be used for lapping centers on work pieces other than shafts. For example, levers having opposed centers to be mounted on pivots, such as pilot screws, may be lapped on the herein described machine.

The lapping tools, or at least the tips thereof, may have any suitable abrasive characteristics to produce a lapped surface of the desired smoothness. For example, the tip of the tool or the entire tool may be composed of abrasive material of the desired grit and hardness held together by a binder. Or, as an alternative, the lapping tools may be made of metal having the tips thereof impregnated with suitable abrasive material, such as diamond dust or chips.

The lapping tools shown and described herein have conical tips for lapping conical recesses in the ends of shafts. It will be understood that some shafts may have pointed conical ends instead of conical recesses, in which case lapping tools having conical recesses to fit over the pointed ends of the shafts would be employed.

Although a particular embodiment of the invention has been shown and described herein, it is to be understood that the invention is not limited to such specific embodiment but is capable of modification and rearrangement and substitution of parts and elements without departing from the spirit of the invention and within the scope of the appended claims.

What is claimed is:

1. In a metalworking apparatus, a vertically disposed cylindrical tool head support, a tool head fixed to said support, an opposed movable tool head also carried by said support, means on said tool head support for maintaining the movable head in fixed angular relation to the fixed head, a tool spindle rotatably supported in each of said heads, and means for feeding the spindle carried by the fixed head toward the spindle carried by the movable head, the spindle on the movable head being fixed axially with respect to said head.

2. In a metalworking apparatus, a pair of spaced opposed tool heads, a tool spindle sleeve fixed to one of said heads, a tool spindle sleeve movable axially of the other head, independently rotatable tool spindles in each of said sleeves, said spindles being rotated in opposite directions, a work engaging tool fixed to the spindle in said fixed sleeve, a work engaging tool depressibly mounted in the spindle carried by said movable sleeve, and a stop for said movable sleeve adjustable to limit the depression of said depressible tool upon engagement with a work piece.

3. In a metalworking apparatus, a pair of spaced opposed tool heads, a tool spindle sleeve fixed to one of said heads, a tool spindle sleeve movable axially of the other head, an independently rotatable tool spindle in each of said sleeves, independent means for imparting opposite rotation to said spindles, a metalworking tool fixed to the spindle in said fixed sleeve for engaging one end of a work piece, a metalworking tool slidably mounted in the other spindle for engaging the other end of a work piece, a spring backing the slidable tool for absorbing the movement thereof, and stop means adjustable to limit the compression of said spring upon engagement of said slidable tool with a work piece.

4. In a metalworking apparatus, a pair of spaced opposed tool heads, a vertical post for supporting said tool heads one above the other, a spindle sleeve fixed to the lower of said tool heads, a spindle sleeve carried by the upper of said tool heads and movable axially thereon, a rotatable tool spindle carried within each of said sleeves in coaxial relation, independent means for imparting opposite rotation to said spindles, a metal working tool fixed to the spindle in said lowerhead and rotatable with said spindle for engaging and supporting the lower end of a work piece, a metalworking tool slidably mounted in the spindle carried by the upper tool head and rotatable with said spindle for engaging the upper end of said work piece, a spring backing said slidable tool for absorbing the movements thereof after engagement with said work piece, and stop means adjustable to arrest the axial movement of said movable spindle sleeve before the limit of sliding movement of said slidable tool is reached.

5. In a metalworking apparatus, a pair of spaced opposed tool heads, a spindle sleeve fixed to one of said heads, a spindle sleeve axially movable in the other of said heads, a rotatable tool spindle supported by each of said sleeves, a conical center lapping tool in each of said spindles to be rotated thereby, a work positioning bracket carried by each of said spindle sleeves, and an adjustable work positioning block carried by each bracket beyond the end of the tool carried by the associated spindle for determining a work piece position traversed by the axes of said tools.

6. In a metalworking apparatus, a pair of spaced opposed tool heads, a spindle sleeve fixed to one of said heads, a spindle sleeve axially movable in the other head, a rotatable tool spindle supported by each sleeve, a conical center lapping tool supported in each spindle for rotation therewith, a work positioning bracket carried by each sleeve, and a work positioning block carried by each bracket beyond the end of the tool in the associated spindle for determining a work piece position between the tools such that the work piece upon becoming engaged by and with the tools is withdrawn by said tools from contact with said work positioning blocks.

VICTOR GREY.